W. DUPRÉ.
DUST PAN WITH AUTOMATIC DEVICE.
APPLICATION FILED AUG. 9, 1912.

1,169,939.

Patented Feb. 1, 1916.

Inventor.
Wilfred Dupré
Atty.

UNITED STATES PATENT OFFICE.

WILFRED DUPRÉ, OF WORCESTER, MASSACHUSETTS.

DUST-PAN WITH AUTOMATIC DEVICE.

1,169,939.   Specification of Letters Patent.   Patented Feb. 1, 1916.

Application filed August 9, 1912. Serial No. 714,251.

*To all whom it may concern:*

Be it known that I, WILFRED DUPRÉ, a citizen of the United States of America, residing at Worcester, in the county of Worcester and State of Massachusetts, have invented certain new and useful Improvements in Dust-Pans with Automatic Devices, of which the following is a specification.

My invention relates to dust-pans and more particularly to dust-pans of that type in which the body or pan proper is provided with a handle so connected with the lid of the dust-pan that the latter is automatically closed when the pan is elevated by the handle.

The object of the invention is to provide an improved dust-pan with a hinged closure and a pivotally connected handle.

Furthermore the object of the invention is to provide a dust-pan with a connection between the handle and lid adapted to raise the lid when the dust-pan is placed in position to receive dust and to automatically close the lid when the dust-pan is moved from place to place as desired.

With the above and other objects in view my invention consists in the detail of construction and in the arrangement of parts and combination as will be herein described and particularly pointed out in the claims.

Figure 1:
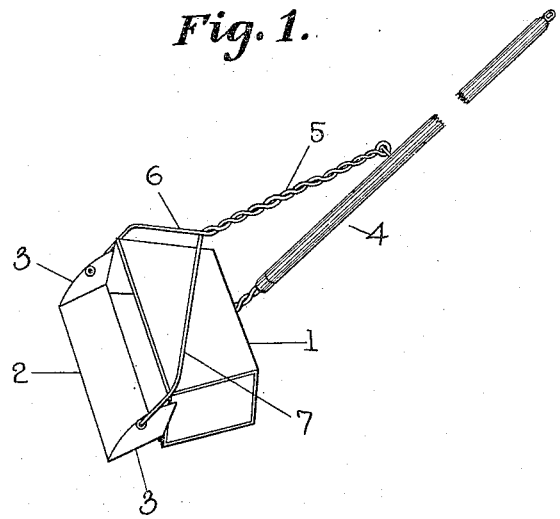
Figure 2:
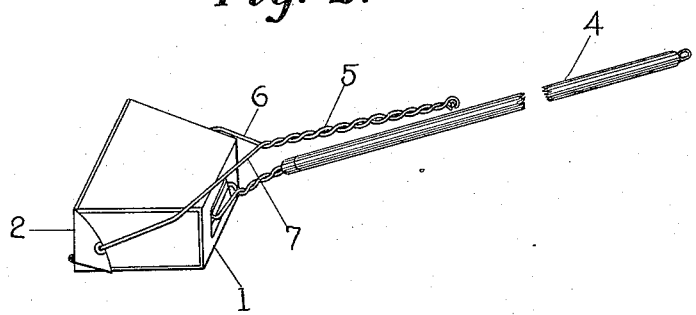
Figure 3:
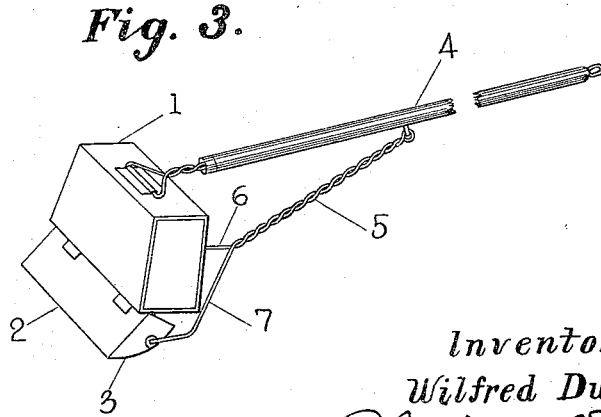

In describing the invention in detail reference will be had to the accompanying drawings forming part of this specification, and in which corresponding parts in the several views are indicated by similar reference characters, and in which, Figure 1 represents a perspective view of my improved dust-pan shown in open position for receiving dust, Fig. 2 is a perspective view showing the same in a closed position, and Fig. 3 is a view showing my improved dust-pan in an inverted position for emptying the dust therefrom.

In the drawings 1 indicates the box-shaped pan which is open at one end. To the lower edge of the box shaped pan is hinged a lid 2 which is provided at each side with approximately triangular shaped end pieces 3 which form a continuation of the side walls of the pan. The end pieces 3 are adapted to extend along the outer surface of the sides of the dust-pan when the lid 2 is in a closed position. On the rear side of the dust-pan I pivotally connect a handle 4 of suitable length and to which I secure intermediate its length a stay 5. The stay 5 is provided with a twisted end portion at one end and at its opposite end it terminates in two arms 6 and 7 which are pivotally connected to each end of the lid 2.

When my improved dust pan is to be used, the pan is placed upon the floor or surface from which the dust is to be taken up and the handle 4 is raised to the position shown in Fig. 1. The raising of the handle moves the lid outward until the edge rests on the floor. The dust is swept by a broom or brush into the pan and when the handle is lowered in the position shown in Fig. 2 the lid is brought into a closed position and the dust-pan may be carried from place to place as desired without the contents being accidentally displaced. The dust-pan may be carried in this position to the dust receptacle and by inverting the pan and holding the handle in an approximately horizontal position the lid is brought into an open position by the stay 5 and the contents allowed to fall into the dust receptacle.

It is to be noted that by my improved dust-pan the dust may be gathered and removed without the necessity of manipulating the lid as the same is automatically operated through the stay 5 being moved by the position of the handle and as the handle is pivotally connected to the pan it is free to be raised and lowered as desired.

It is believed that the operation, construction, combination and arrangement of my improved dust-pan will be fully understood from the foregoing description, it being noted that various changes may be made in the proportions of construction without departing from the scope of my invention.

Having thus fully described my said invention what I claim as new and desire to secure by Letters Patent is:

1. In a device of the class described, a pan formed with its front face open, a closure for said open face, a handle freely hinged to the rear portion of said pan, and a stay having its forward end hinged to said closure and its rear end hinged to said handle.

2. In a device of the class described, a pan formed with its front face open, a closure for said open face, a handle freely hinged to the rear portion of said pan, and a stay having its forward end hinged to said closure and its rear end hinged to said handle, the distance between the front and rear ends of the stay being greater than that between the rear end of the stay and the hinged joint between the handle and the pan.

3. In a device of the class described, a pan formed with its front face open, a closure for said open face hinged at its bottom edge to said pan, a handle hinged to the rear portion of said pan, and a stay having its forward end hinged to said closure and its rear end hinged to said handle above said pan whereby when the front edge of said pan swings downwardly said pan will automatically close and when it swings upwardly, said pan will automatically open.

In testimony whereof, I affix my signature in the presence of two witnesses.

WILFRED DUPRÉ.

Witnesses:
O. A. TAFT,
E. F. THOMPSON.

Copies of this patent may be obtained for five cents each, by addressing the "Commissioner of Patents, Washington, D. C."